United States Patent [19]

Uchino

[11] Patent Number: 4,829,208
[45] Date of Patent: May 9, 1989

[54] FLAT MOTOR HAVING A ROTATABLE SHAFT, A STEPPED PORTION FORMED IN SAID SHAFT, AND APPARATUS FOR PRODUCING SAME

[75] Inventor: Setsuya Uchino, Sano, Japan

[73] Assignee: Nihon Radiator Co., Ltd., Tokyo, Japan

[21] Appl. No.: 112,877

[22] Filed: Oct. 23, 1987

[30] Foreign Application Priority Data

Oct. 23, 1986 [JP] Japan ................ 61-250740

[51] Int. Cl.⁴ ............................................. H02K 1/22
[52] U.S. Cl. ..................................... 310/268; 310/43; 310/89; 310/154; 310/237; 29/596
[58] Field of Search ................. 310/268, 42, 43, 154, 310/67 R, 62, 63, 237, 88, 89, 90; 29/596

[56] References Cited

U.S. PATENT DOCUMENTS

| 3,544,822 | 12/1970 | Pickles | 310/268 |
| 3,566,165 | 2/1971 | Lohr | 310/268 |
| 4,626,720 | 12/1986 | Fukasaku et al. | 310/62 |
| 4,629,919 | 12/1986 | Merkle | 310/67 R |
| 4,677,335 | 6/1987 | Ueda et al. | 310/268 |
| 4,682,065 | 7/1987 | English | 310/43 |
| 4,737,673 | 4/1988 | Wrobel | 310/67 R |

FOREIGN PATENT DOCUMENTS

| 0018014 | 9/1972 | Japan*. | |
| 0032099 | 2/1982 | Japan . | |
| 0141667 | 8/1983 | Japan | 310/268 |
| 199152 | 12/1986 | Japan . | |
| 2841 | 1/1987 | Japan . | |

Primary Examiner—R. Skudy
Attorney, Agent, or Firm—Gordon W. Hueschen

[57] ABSTRACT

A flat motor device in which resin is molded around a knurling portion to thereby form a rotor hub, the rotor hub being projected outwardly of a casing, a shaft projected from the rotor hub is formed with a small diameter threaded portion so as to create an offset portion in a shaft body portion, and a fan is directly mounted on the end surface of the rotor hub, the offset portion is formed in the shaft being utilized to easily manufacture, a flat motor.

7 Claims, 2 Drawing Sheets

000
FLAT MOTOR HAVING A ROTATABLE SHAFT, A STEPPED PORTION FORMED IN SAID SHAFT, AND APPARATUS FOR PRODUCING SAME

BACKGROUND OF THE INVENTION

1. Field of the Invention

The present invention relates to a flat motor device, method and apparatus for producing the same, in which flat motor device, a fan is rotated by a flat motor (for example, such as a print motor, wire-wound type flat motor, etc.).

2. Description of the Prior Art

In flat motor devices used for blower devices of a radiator cooling apparatus for automobiles or an air conditioning apparatus for automobiles, a fan is mounted at the end of a shaft projected from the motor (see, for example, such as Japanese Patent Application Laid-Open No. 2,841/1987, Japanese Utility Model Application Laid-Open No. 199,152/1986, Japanese Patent Application Laid-Open No. 18,014/1972, and Japanese Patent Application Laid-Open No. 32,099/1982).

In the motor used for such a flat motor device, a closed casing is formed by a first bracket and a second bracket, which are formed from a plate-like flat plate, a shaft is rotatably supported within the closed casing, and a rotor hub is mounted on the shaft through a sleeve. The rotor hub, which is made of synthetic resin, has a rotor portion mounted thereon which has a commutator and an armature electrically connected to the commutator.

A feeder brush comes into contact with the commutator, and a turning force is produced by interaction between a magnetic force provided through a slight clearance relative to the armature and an electric current flowing into the armature.

On the other hand, a flat portion cut off by a milling machine or the like is formed on the end of the aforesaid shaft, a fan having a center hole having the same shape as that of said flat portion and a fan plate are fitted into said flat portion, a nut is screwed into the threads formed on the end of said shaft, and said fan and said fan plate are held between a shoulder created by forming said flat portion and the nut.

In the case where such a flat motor device is produced, there are employed (A) a method in which a shaft is directly pressed into a center hole of the rotor rub (see the aforesaid Japanese Patent Application Laid-Open No. 18,014/1962) (B) a method in which a sleeve is inserted through the center of the rotor rub, and a shaft is inserted into the sleeve (see the aforesaid Japanese Patent Application Laid-Open No. 2,841/1987).

If a flat motor device is produced without using such a sleeve as described in the former reference, the following inconveniences occur.

First, if the rotor hub is directly resin-molded on the shaft without using a sleeve, when a male die and a female die are not closely coincided at the time of resin molding, corners or the like of the die touches on the surface of a shaft finished with high precision during spotting, possibly damaging the surface of the shaft.

Secondly, during the resin molding, the resin flows along the surface of the shaft from a clearance between the dies, possibly making the resin adhere to unnecessary portions.

Thirdly, during pressing, there possibly effects cracks in a rotor hub made of resin.

However, in the case of the rotor portion having a sleeve provided between a shaft and a rotor hub as described in the later reference, the shaft need to be formed with a knurling portion having the outside diameter larger than the inside diameter of the sleeve so as to provide a positive engagement between the sleeve and the shaft. With this arrangement, the sleeve is, when pressed in, inflated radially outwardly by the knurling porton, and the rotor hub made of resin in the outer periphery of the sleeve possibly cracks due to the inflation.

In order to prevent the occurrence of such a crack, a proposal has been made so that the engaging portion between the sleeve and the knurling portion is made axially and externally of the rotor hub. However, this increases an axial dimension of the flat motor device to materially impair the effectual properties of the flat motor.

Moreover, use of such a sleeve brings forth an increase in number of parts, being naturally disadvantageous in view of the cost.

Furthermore, if a flat portion for mounting a fan is formed on the end of the shaft using a milling machine or the like, the cost increases in terms of machining, and in addition, there involves an inconvenience in that an axial dimension of the motor itself increases due to the presence of the flat portion.

The present invention has been achieved to overcome the above-described disadvantages and problems.

It is a first object of the present invention to provide an inexpensive flat motor device in which a rotor hub is directly resin molded on a shaft to thereby form a rotor portion, and a fan is directly mounted on the end surface of a rotor hub to make an axial dimension small, facilitate the producing operation and reduce the number of parts.

It is second object of the present invention to provide a producing method which in case of producing the aforesaid flat motor device, can positively carry out resin mold molding without use of a sleeve.

It is a third object of the present invention to provide a producing apparatus which can prevent resins from flowing into unnecessary portions during resin molding.

SUMMARY OF THE INVENTION

According to the present invention, there is provided a flat motor device characterized in that outer peripheral portions of a first bracket and a second bracket in the form of flat plates are closely united to thereby form a casing, a magnet is mounted on said first bracket and a shaft is supported by a bearing portion provided in a center hole thereof, a rotor hub made of resin is subjected to direct mold mounting to a knurled portion formed in the other part of said shaft, a flat rotor member having an armature and a commutator is mounted on said rotor hub so as to be opposed thereto through a clearance as small as possible relative to said magnet, the second bracket is provided in proximity to the rotor portion and said rotor hub is projected outwardly of said casing, a threaded portion having a smaller diameter than said shaft is formed on the end of said shaft so as to project from the smooth end of said rotor hub, and a boss portion of a fan is inserted and tightened by a nut so that said boss portion may come into contact with an offset portion between said shaft body portion and said threaded portion.

In this manner, the rotor hub projects outside the casing, and the offset portion of the shaft and the end surface of the rotor hub may be utilized to directly mount the fan. Therefore, a small axial dimension of the flat motor device may be obtained. Furthermore, the threaded portion having a smaller diameter than that of the shaft is formed on the end of the shaft, and in case of the resin molding, the offset portion created in the shaft within the mold may be utilized to check a flow of resin. Therefore, the rotor hub can be made of resin and the shaft connected thereto without use of a sleeve to provide a positive connection between the shaft and the rotor hub.

DETAILED DESCRIPTION OF THE PREFERRED EMBODIMENT

Figure 1:
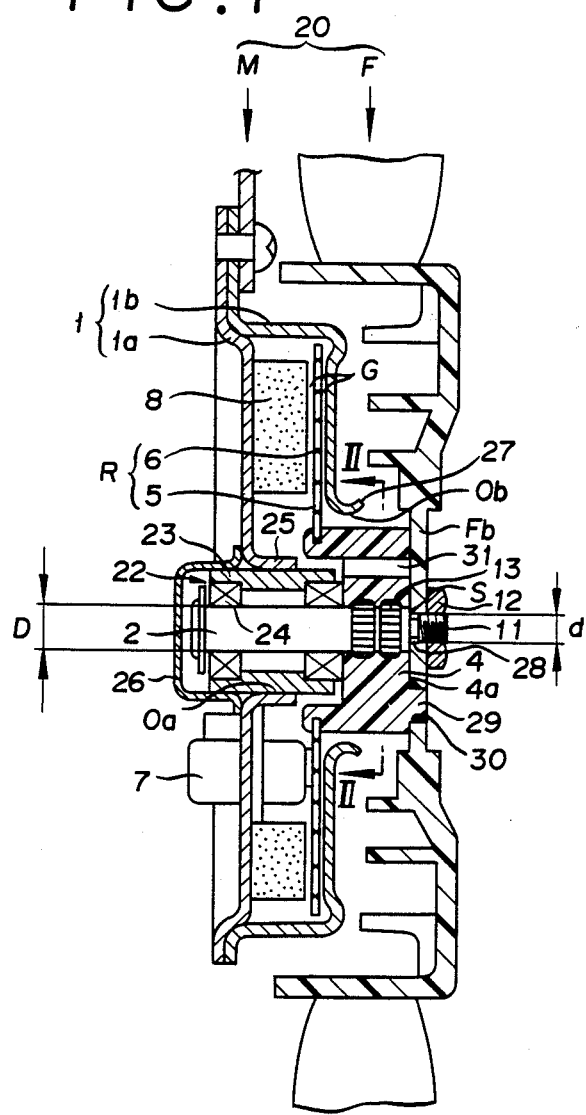
FIG. 1 is a sectional view showing one embodiment of the present invention.

A flat motor device according to the present invention will be described hereinafter on the basis of an embodiment.

This flat motor device 20 is constituted by mounting a fan F on a motor M. The motor M in the flat motor device 20 has a closed casing 1 formed by a first bracket 1a and a second bracket 1b formed from plate-like flat plates, a shaft 2 is rotatably supported within the closed casing 1, and a rotor hub 4 is mounted on the shaft 2. The rotor hub 4 is made of synthetic resin, to which is mounted a thin, flat, annular rotor member R having flat, annular faces comprising a commutator portion 5 and an armature portion 6 electrically connected to the commutator 5 (In the illustration, a print motor is used in order to make the whole body flat, and the commutator 5 and the armature 6 are formed integrally.).

A magnet 8 is secure by adhesive or the like to the flat plate-like bracket 1a and has a flat annular face apposed to and parallel with the flat annular portion of bracket 1b. The armature portion 6 is disposed to rotate between the magnet 6 and the bracket 1b with its annular faces parallel to the flat annular portions of the magnet 8 and the bracket 1b through a slight clearance from each.

The bracket 1a is provided with a bearing portion 22 disposed axially in a center hole Oa thereof. This bearing portion 22 consists of a pair of bearings 24 provided within a bearing housing 23 to rotatably support the shaft 2.

A feeder brush 7 touches the commutator 5, and a turning force is produced by the interaction between the field of magnet 8 and an electric current flowing into the armature 6.

In this bearing portion 22, a center portion thereof is supported by making use of a bended portion 25 formed by inwardly bending a peripheral edge portion which forms the center hole Oa of the first bracket 1a. With this, an amount of projection of the shaft 2 from the casing is made small.

The center hole Oa is sealed by a cap 26 to prevent an entry of rain water or the like from the outside.

The shaft 2 is formed at the other end part with a knurling portion 13. This knurling portion 13 is a portion by which the rotor hub 4 is mold-mounted directly, that is, without through a sleeve as previously mentioned.

At this molding, the flat rotor portion R having the armature 6 and the commutator 5 integrated is processed at the same time, the rotor portion R being positioned at the rear end close to the magnet 8 of the rotor hub 4. This rotor portion R is disposed opposedly to the magnet 8 through a clearance G as small as possible.

The second bracket 1b is provided in proximity to the rotor portion R and extends, as a yoke which receives magnetic lines of force of the magnet 8, to the of the rotor hub 4. A peripheral edge portion forming the center hole Ob of the second bracket 1b is formed into a curled portion 27 curled outwardly, and this curled portion 27 prevent water drops entered through the second bracket 1b from entering the casing 1.

When the second bracket 1b is provided as a yoke in proximity to the armature 6, a major portion of the rotor hub 4 is exposed to outside from the casing 1, and also with this, this motor M becomes considerably flat.

Particularly, in the present embodiment, a threaded portion 11 formed on the end of the shaft 2 is formed to have a smaller diameter d than a diameter D of other parts of the shaft 2 so as to create an offset portion s between the threaded portion 11 and the other portion and at the same time a recess 28 having a smaller diameter than the diameter d is formed on the bottom of the threaded portion 11.

In this manner, in the case where in the manufacture of a flat motor, the shaft 2 is set within a metal mold and resins are poured for molding, the threaded portion 11 is fitted into a recess 37 of a male die 33 is brought into contact with the offset portion s, and a shaft body portion may be supported by a hole portion 39 of a female die 32. With this, the shaft 2 may be positively supported, and the shaft itself receives no damage from the mold. When the resin is poured as will be described later, the resin will not flow into the threaded portion 11 by the contact between the offset portion s and the male die 33, and no possible adherence of resin to unnecessary portions occurs. That is, the shaft 2 and the rotor hub 4 may be positively resin-molded without use of the aforementioned sleeve. If the resin flows into through the gap between the male die 33 and the offset portion s, an unnecessary adherence of resin to the threaded portion 11 may be avoided by the existence of the recess 28 having a smaller diameter than a diameter d.

In the present invention, an end surface 4a of the resin-made rotor hub 4 projected outside from the casing 1 is smoothly finished, a projection 29 is projected from the end surface 4a, this projection 29 and a through-hole 30 of a fan boss portion Fb are mated with each other and fastened by means of a nut 12, and the fan F is mounted on the shaft 2. With this, the boss portion Fb of the fan F is directly mounted on the rotor hub 4, and the aforementioned flat portion may be removed, whereby the axial dimension of the flat motor device 20 can be made small, and transmission of torque from the motor to the fan may be carried out effectively.

Figure 2:
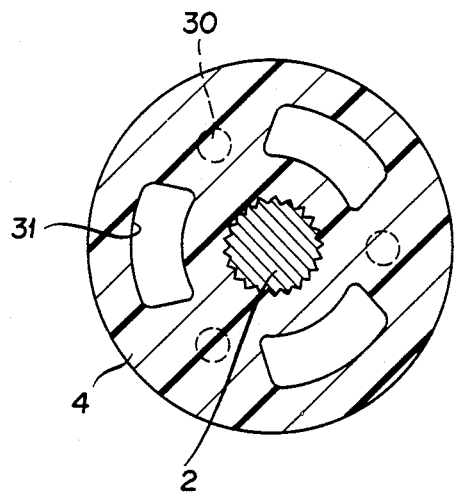
FIG. 2 is a view taken on line II—II of FIG. 1.

This rotor hub 4 has a plurality of radiating through-holes 31 as shown in FIG. 2 (which is a view taken on line II—II of FIG. 1). In this flat motor device 20, mechanical frictional heat is generated in the bearing portion 22 and electric Joule heat is generated in the portion of the armature 6. Therefore, the casing 1 tends to be interiorly full of heat, but is the through-holes 31 are provided, this heat is promptly transmitted to the fan boss portion Fb, through which heat is emitted outside.

Figure 3:
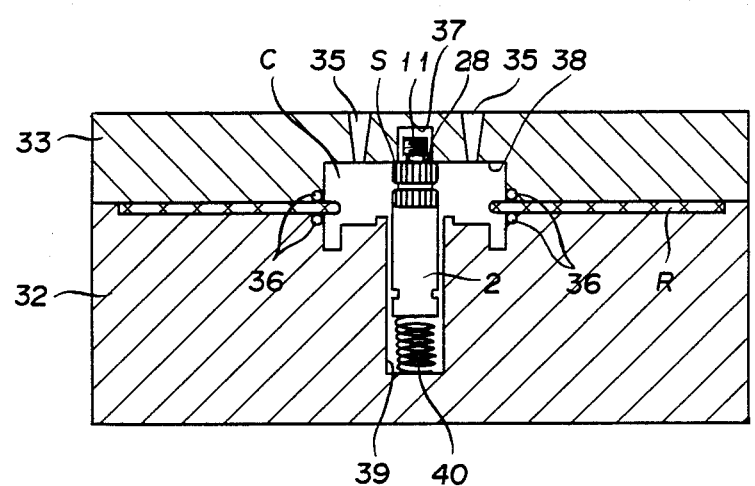
FIG. 3 is a schematic sectional view showing a state wherein the said embodiment is assembled.

In order to manufacture the rotor portion R constructed as described above, firstly, the shaft 2 is inserted and stood upright in a hole portion 39 within the female die 32 as shown in FIG. 3. In this case, if a spring 40 is disposed within the hole 39 of the female die, the shock is relieved when the shaft 2 is inserted.

Secondly, the male die 33 is moved downward and the threaded portion 11 is fitted into the recess 37 of the male die 33. The corner portion of the inner peripheral edge of the recess 37 of the male die (the lower surface 38 of the male die 33) is brought into contact with the offset portion s between the threaded portion 11 and the body portion of shaft 2, and the cavity C is formed around the knurling portion 13. In this case, the shaft 2 is stably retained to give no damage to the shaft 2.

Particularly, since the corner portion of the inner peripheral edge of the recess 37 of the male die is brought into contact with the offset portion s formed at a position close to the threaded portion 11, even if resins are poured through resin pouring openings 35, 35, unnecessary resin is not adhered to the threaded portion 11. Accordingly, the resin poured into the cavity C is positively mounted around the knurling portion 13.

In FIG. 3, reference numeral 36 designated an O ring provided in a united surface portion between the male and female dies 32, 33 and in a portion positioned in the outer periphery of the cavity C. This O ring 36 allows the aforesaid poured resin to pass though the male and female surfaces to prevent it from flowing onto the surface of the armature.

The flat motor device 20 formed as described above eliminates the need of the flat portion of the shaft as described above, a fan plate, a sleeve, a washer, and the like. In addition, the rotor hub 4 is projected outside the housing 1 and the fan F is directly mounted on the rotor hub 4. Therefore, the flat motor device according to the present invention is materially shorter in the axial dimension as compared with the conventional flat motor device. The number of parts is small and the cost is low.

Moreover, since the offset portion s is formed between the body portion of the shaft 2 and the threaded portion 11, when the rotor hub 4 is resin-molded, resin molding can be positively carried out without use of a sleeve.

What is claimed is:

1. A flat motor device characterized in that peripheral portions of a first bracket and a second bracket in the form of flat plates are closely united to thereby form a casing having spaced-apart, parallel, annular faces, a magnet is mounted on the inside of said first bracket, and a rotatable shaft is axially supported by a bearing portion in a center hole of said casing, a rotor hub made of resin is directly molded to a knurled portion formed in the other part of said shaft, a flat rotor member having an armature portion and a commutator portion is mounted on said rotor hub so as to be opposed through a clearance as small as possible relative to said magnet, the second bracket is disposed in proximity to the rotor member and said rotor hub is projected outwardly of said casing, a threaded portion having a smaller diameter than said shaft is formed on the end of said shaft so as to provide an offset portion between said shaft body and said threaded portion which coincides with the smooth end of said rotor hub, and a boss portion of a fan is affixed in position by a nut so that said boss portion comes into contact with said offset portion and the smooth end of said hub.

2. A flat motor device according to claim 1, wherein said rotor member has the armature and the commutator member integrally formed.

3. A flat motor device according to claim 1 wherein said first bracket has an inner peripheral portion bent inwardly forming a center hole.

4. A flat motor device according to claim 1 wherein said second bracket has an inner peripheral portion curled outwardly forming a center hole.

5. A flat motor device according to claim 1 wherein said rotor hub is formed with radiating through-holes.

6. A flat motor device according to claim 1 wherein said rotor hub has a projection extended from an end surface thereof, and a boss portion of a fan is fitted in said projection.

7. Apparatus of claim 1 in which said shaft has an annular recess between the threaded portion and the offset shoulder.

* * * * *

UNITED STATES PATENT AND TRADEMARK OFFICE
CERTIFICATE OF CORRECTION

PATENT NO. : 4,829,208
DATED : May 9, 1989
INVENTOR(S) : Setsuya Uchino

It is certified that error appears in the above-identified patent and that said Letters Patent is hereby corrected as shown below:

Title Page, [57] ABSTRACT, line 7; delete "is"
Title Page, [57] ABSTRACT, line 8; after "manufacture" delete the comma ","
Col. 2, line 11; "porton," should read -- portion, --
Col. 2, line 61; "portion" should read -- member --

Col. 4, line 11; after "to the" insert -- neighborhood --
Col. 4, line 68; "but is" should read -- but, since --
Col. 5, line 30; "though" should read -- through --
Col. 6, line 27; after "armature" insert -- member --

Signed and Sealed this

Eighth Day of May, 1990

Attest:

HARRY F. MANBECK, JR.

*Attesting Officer*     *Commissioner of Patents and Trademarks*